US010912245B2

(12) United States Patent
Stovall et al.

(10) Patent No.: US 10,912,245 B2
(45) Date of Patent: Feb. 9, 2021

(54) SYSTEM AND METHOD FOR REGULATING THE FLOW OF FLUID SUPPLIED TO ACTUATORS OF AN AGRICULTURAL IMPLEMENT

(71) Applicant: CNH Industrial America LLC, New Holland, PA (US)

(72) Inventors: Christopher Stovall, Chicago, IL (US); Michael Freisleben, Homer Glen, IL (US); Duqiang Wu, Bolingbrook, IL (US); John C. Endsley, Washington, IL (US); Michael Glennon, Normal, IL (US); Kevin D. McKee, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 133 days.

(21) Appl. No.: 16/220,974

(22) Filed: Dec. 14, 2018

(65) Prior Publication Data
US 2020/0187407 A1 Jun. 18, 2020

(51) Int. Cl.
*A01B 63/112* (2006.01)
*A01B 49/02* (2006.01)
(Continued)

(52) U.S. Cl.
CPC .......... *A01B 63/112* (2013.01); *A01B 29/048* (2013.01); *A01B 49/027* (2013.01); *A01B 63/22* (2013.01)

(58) Field of Classification Search
None
See application file for complete search history.

(56) References Cited

U.S. PATENT DOCUMENTS 7,017,675 B2 3/2006 Ankenman et al.
7,766,093 B2 8/2010 Becker et al.
(Continued)

FOREIGN PATENT DOCUMENTS

WO   WO 2016/204685   * 12/2016   ............. A01B 63/10

OTHER PUBLICATIONS

CaseIH Agriculture, "Field Cultivators," 24 pages https://www.caseih.com/northamerica/en-us/products/tillage/field-cultivators.
(Continued)

*Primary Examiner* — Abiy Teka
*Assistant Examiner* — Michael Quandt
(74) *Attorney, Agent, or Firm* — Rebecca L. Henkel; Rickard K. DeMille (57) ABSTRACT

In one aspect, a system for regulating the flow of fluid supplied to actuators of an agricultural implement may include a tool and a fluid-driven actuator configured to actuate the tool relative to a surface. The system may also include a pump configured to supply fluid to the fluid-driven actuator and a valve configured to control a flow of the fluid supplied to the fluid-driven actuator. Furthermore, the system may include a first sensor configured to detect a parameter indicative of a first pressure upstream of the valve and a second sensor configured to detect a parameter indicative of a second pressure downstream of the valve. Additionally, the system may include a controller communicatively coupled to the first and second sensors, with the controller configured to determine a pressure differential across the valve based on measurement signals received from the first and second sensors.

19 Claims, 6 Drawing Sheets

(51) Int. Cl.
*A01B 29/04* (2006.01)
*A01B 63/22* (2006.01)

(56) References Cited

U.S. PATENT DOCUMENTS

| | | |
|---|---|---|
| 8,430,179 B2 | 4/2013 | Van Buskirk et al. |
| 8,573,319 B1 | 11/2013 | Casper et al. |
| 9,155,237 B2 | 10/2015 | Van Buskirk et al. |
| 9,247,687 B2 | 2/2016 | Gray et al. |
| 9,363,938 B1 | 6/2016 | Slagel et al. |
| 9,521,798 B2 | 12/2016 | Kovach et al. |
| 9,635,797 B2 | 5/2017 | Kovach et al. |
| 9,723,776 B2 | 8/2017 | Sporrer et al. |
| 9,775,278 B2 | 10/2017 | Zemenchik et al. |
| 9,918,422 B2 * | 3/2018 | Campbell |
| 10,087,960 B2 * | 10/2018 | Wagers ................ F16H 61/421 |
| 10,227,998 B2 * | 3/2019 | Lacher ................... F15B 11/08 |
| 10,349,571 B2 * | 7/2019 | Fink ....................... F15B 11/10 |
| 2017/0079192 A1 | 3/2017 | Steinlage et al. |
| 2018/0132414 A1 | 5/2018 | Sander et al. |
| 2018/0139884 A1 | 5/2018 | Karstens et al. |

OTHER PUBLICATIONS

KSFarms, "Hydraulic Controlled Rolling Baskets," 2 pages https://www.ksfarmsmfg.com/rolling_baskets.html.

\* cited by examiner

SYSTEM AND METHOD FOR REGULATING THE FLOW OF FLUID SUPPLIED TO ACTUATORS OF AN AGRICULTURAL IMPLEMENT

FIELD OF THE INVENTION

The present disclosure generally relates to agricultural implements and, more particularly, to systems and methods for regulating the flow of fluid to actuators, such as hydraulic cylinders, of an agricultural implement.

BACKGROUND OF THE INVENTION

Certain agricultural implements include ground engaging tools configured to interact with the soil. For example, a tillage implement may include harrow discs, shanks, leveling discs, harrow tines, rolling baskets, and/or the like, which loosen and/or otherwise agitate the soil to prepare the soil for subsequent planting operations. As such, tillage implements may include one or more actuators (e.g., one or more hydraulic cylinders) configured to control the penetration depth of and/or the down force being applied to the ground engaging tools.

Typically, one or more valves on the implement or an associated work vehicle are configured to control or otherwise regulate a flow of pressurized fluid (e.g., hydraulic oil) generated by a pump on a work vehicle configured to tow the implement and supplied to the actuator(s). In an effort to ensure adequate fluid flow is supplied to the actuator(s), many operators set the operational parameters of the valve(s) such that the pump generates more fluid flow than is necessary to operate the actuator(s). However, the generation of excess fluid unnecessarily increases the load on an engine of the work vehicle, thereby reducing the efficiency of the implement and/or the work vehicle.

Accordingly, an improved system and method for regulating the flow of fluid to actuators of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for regulating the flow of fluid supplied to actuators of an agricultural implement. The system may include a tool, a fluid-driven actuator configured to actuate the tool relative to a surface, and a pump configured to supply fluid to the fluid-driven actuator. The system may also include a valve configured to control a flow of the fluid supplied to the fluid-driven actuator. Furthermore, the system may include a first sensor configured to detect a parameter indicative of a first pressure upstream of the valve and a second sensor configured to detect a parameter indicative of a second pressure downstream of the valve. Additionally, the system may include a controller communicatively coupled to the first and second sensors, with the controller configured to determine a pressure differential across the valve based on measurement signals received from the first and second sensors.

In another aspect, the present subject matter is directed to a method for regulating the flow of fluid supplied to actuators of an agricultural implement. The agricultural implement may include a fluid-driven actuator configured to actuate a tool of the agricultural implement relative to a surface and a pump configured to supply fluid to the fluid-driven actuator. Moreover, the agricultural implement may include a first valve configured to control a flow of the fluid supplied to the fluid-driven actuator. The method may include controlling, with a computing device, an operation of the first valve based on an input associated with a desired operating parameter associated with the tool. The method may also include determining, with the computing device, a pressure differential between a first pressure upstream of the first valve and second pressure downstream of the first valve. Furthermore, the method may include controlling, with the computing device, an operation of a second valve of the agricultural implement based on the determined pressure differential, with the second valve positioned upstream of the first valve and configured to control a flow of the fluid supplied by the pump to the first valve.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF IRE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for regulating the flow of fluid supplied to actuators of an agricultural implement. Specifically, in several embodiments, the system may include a pump configured to supply fluid (e.g., hydraulic oil) to one or more fluid-driven actuators of the implement. The actuator(s) may, in turn, be configured to actuate one or more tools (e.g., baskets assemblies) mounted on the implement relative to the surface of a field across which the implement is being moved. Furthermore, the system may include a first valve (e.g., a pressure regulating valve) configured to control a flow of the fluid supplied to the actuator(s). For example, in one embodiment, the first valve may correspond to a pressure regulating valve mounted on the implement and configured to supply the fluid flow to the actuator(s) at a selected pressure. Additionally, the system may include a first sensor configured to detect a first pressure of upstream of the valve and a second sensor configured to detect a second pressure downstream of the valve. As such, a controller of the disclosed system may be configured to determine a pressure differential across the first valve based on measurement signals received from the first and second sensors.

Moreover, in accordance with aspects of the present subject matter, the system may include a second valve positioned upstream of the first valve. As such, the second valve may be configured to control the flow of fluid supplied to the first valve by the pump. For example, in one embodiment, the second valve may correspond to an electro-hydraulic remote (EHR) valve block installed on a work vehicle configured to tow the implement across the field. In several embodiments, the controller may be configured to control the operation of the second valve based on the determined pressure differential. The pump may, in turn, be controlled based on the operation of the second valve. For example, in the event that the determined pressure differential exceeds a maximum threshold, the controller may be configured to control the operation of the second valve such that the second valve provides a decreased flow of fluid to the first valve. In such instance, the pump may be controlled such that the pump supplies a decreased flow of fluid. Conversely, in the event that the determined pressure differential falls below a minimum threshold, the controller may be configured to control the operation of the second valve such that the second valve provides an increased flow of fluid to the first valve. In such instance, the pump may be controlled such that the pump supplies an increased flow of fluid. In several embodiments, such control of the second valve based on the determined pressure differential may override any control of the second valve based on operator input.

Figure 1:
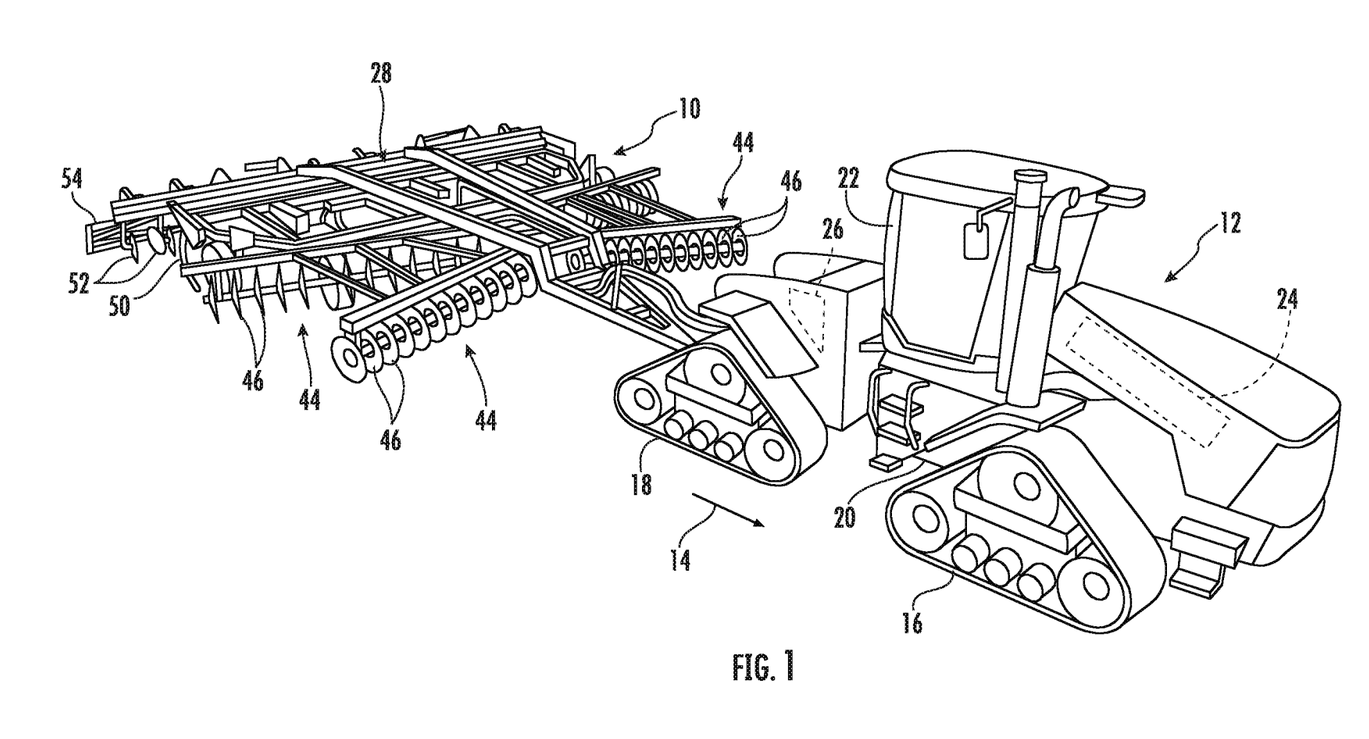
FIG. 1 illustrates a perspective view of one embodiment of an agricultural implement coupled to a work vehicle in accordance with aspects of the present subject matter.
Figure 2:
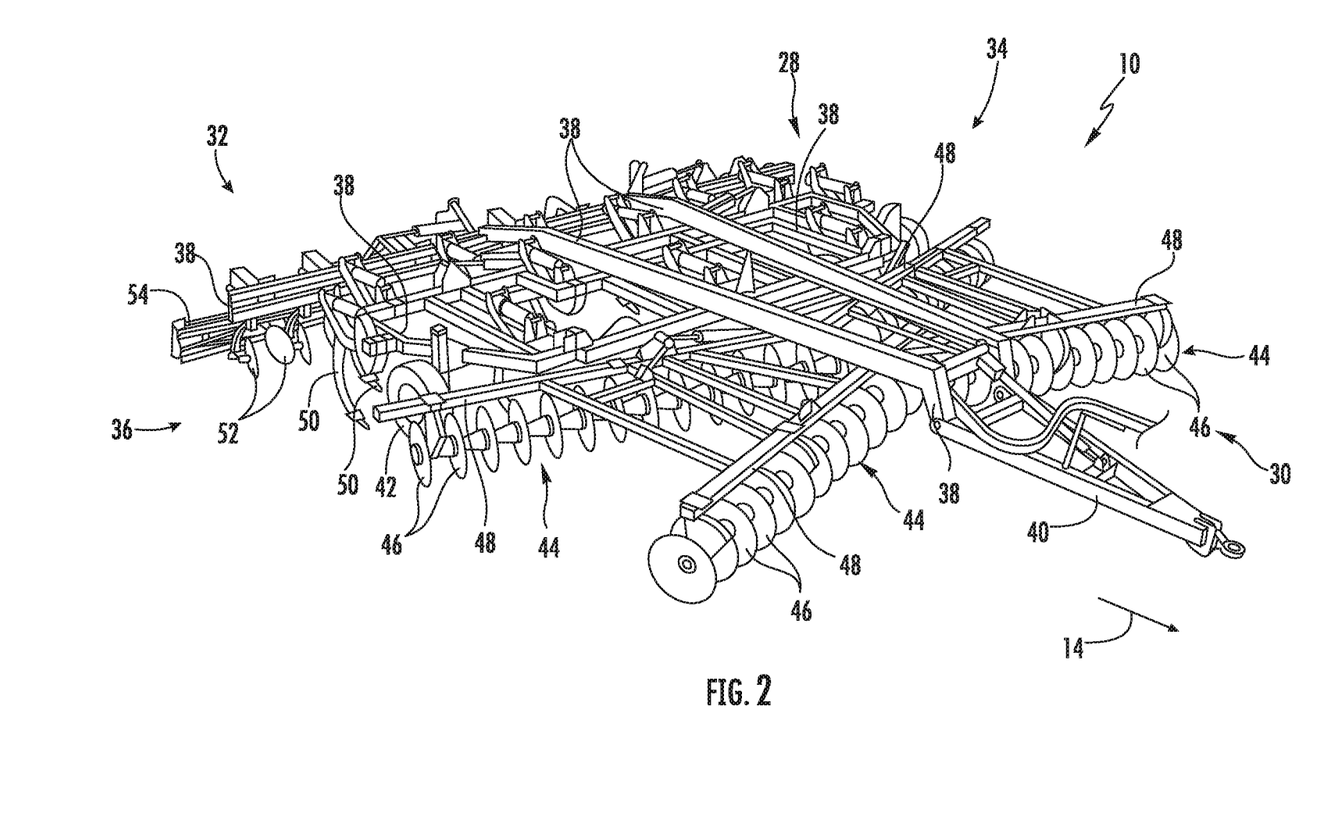
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102 shown in FIG. 4) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disc blades 46. Each disc blades 46 may, in turn, be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler)

basket assemblies 54. However, in other embodiments, any other suitable ground-engaging tools may be coupled to and supported by the implement frame 28, such as a plurality closing discs.

Figure 3:
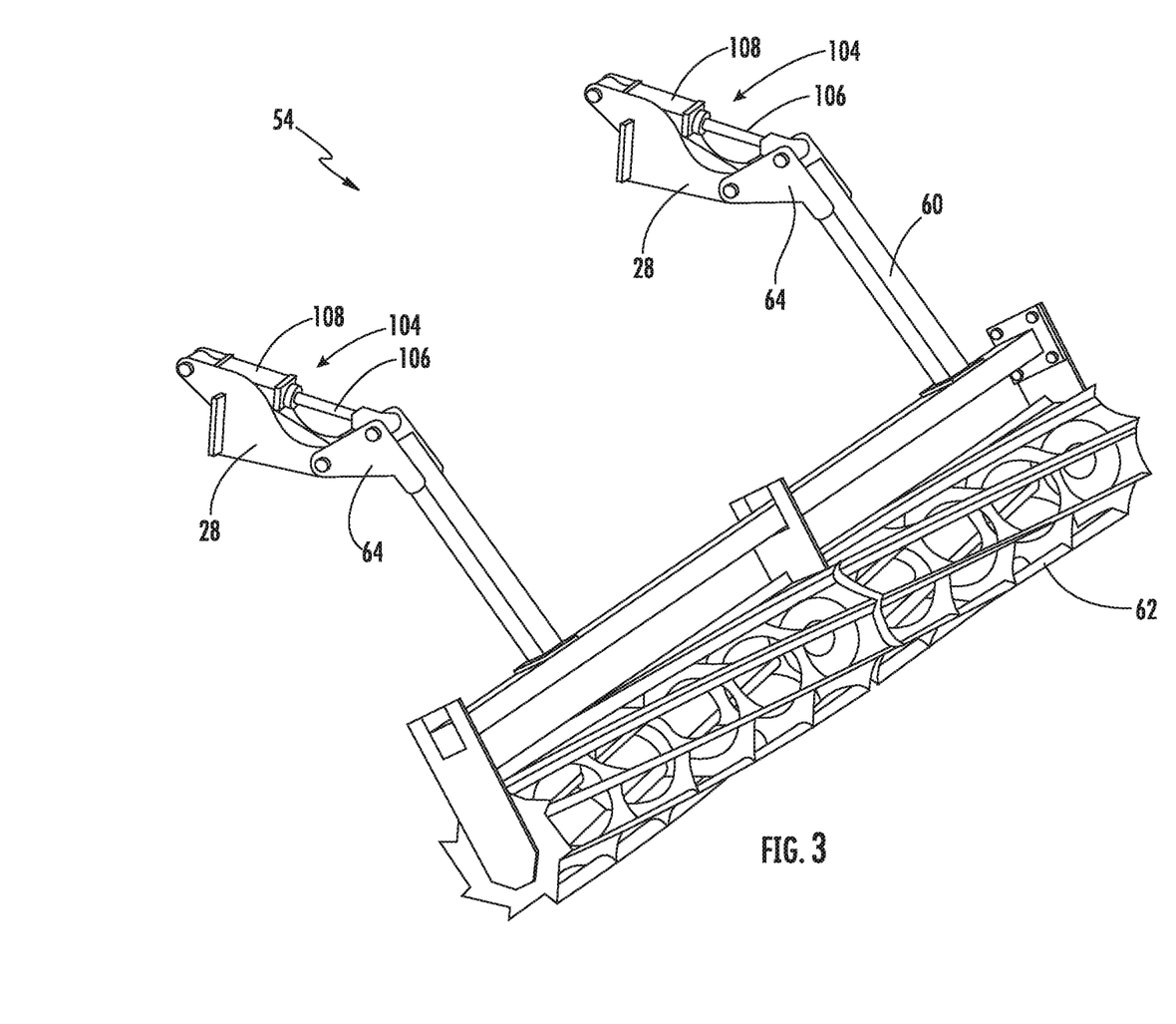
FIG. 3 illustrates a perspective view of one embodiment of a basket assembly of an agricultural implement in accordance with aspects of the present subject matter.

Referring now to FIG. 3, a perspective view of one embodiment of a basket assembly 54 of the implement 10 is illustrated in accordance with aspects of the present subject matter. Specifically, in several embodiments, the basket assembly 54 may include a basket assembly frame 60 that rotatably supports one or more rolling (or crumbler) baskets 62. The basket(s) 62 may, in turn, be configured to roll along the soil surface, thereby breaking up dirt clods or otherwise reducing the soil roughness of the field across which the implement 10 is being moved. Furthermore, the basket assemblies 54 may be pivotable or otherwise moveable relative to the implement frame 28 to permit one or more basket assembly actuators 104 to adjust the position of the basket assembly 54 relative to the frame 28. For example, as shown in the illustrated embodiment, a first end of each actuator 104 (e.g., a rod 106 of the actuator 104) may be coupled to a support bracket 64, which is, in turn, coupled to the basket assembly frame 60, while a second end of each actuator 104 (e.g., the cylinder 108 of the actuator 104) may be coupled to the implement frame 28. The rod 106 of each actuator 104 may be configured to extend and/or retract relative to the corresponding cylinder 108 to adjust the down pressure being applied to the basket(s) 62. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that the configuration of the implement 10 and the work vehicle 12 described above and shown in FIGS. 1-3 is provided only to place the present subject matter in an exemplary field of use. Thus, it should be appreciated that the present subject matter may be readily adaptable to any manner of implement and/or work vehicle configuration.

Figure 4:
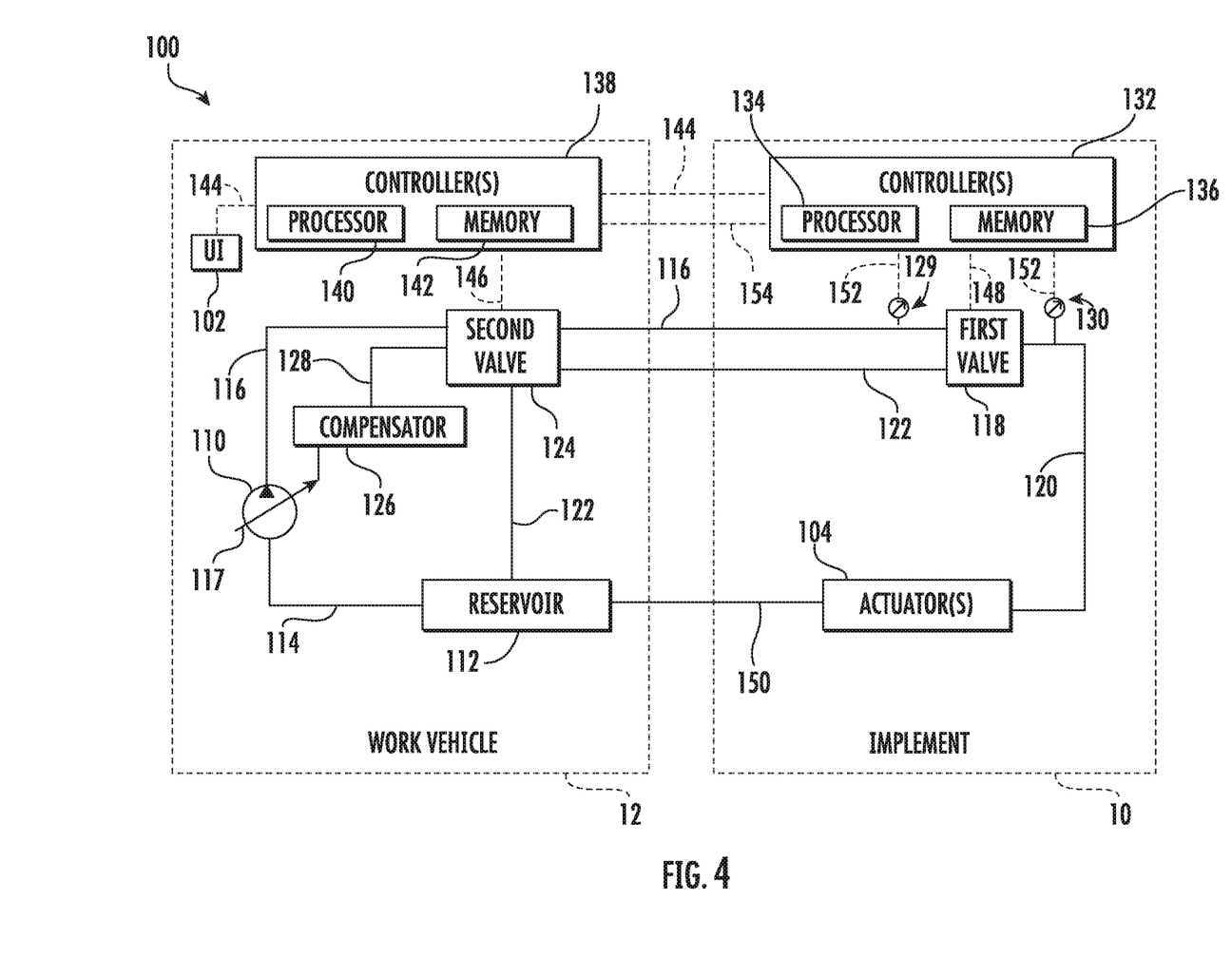
FIG. 4 illustrates a schematic view of one embodiment of a system for regulating the flow of fluid supplied to actuators of an agricultural implement in accordance with aspects of the present subject matter, particularly illustrating the system including a first valve assembly installed on the implement and a second valve installed on a work vehicle configured to tow the implement.

Referring now to FIG. 4, a schematic view of one embodiment of a system 100 for regulating the flow of fluid supplied to actuators of an agricultural implement is illustrated in accordance with aspects of the present subject matter. In general, the system 100 will be described herein with reference to the implement 10 and the work vehicle 12 described above with reference to FIGS. 1-3. However, it should be appreciated by those of ordinary skill in the art that the disclosed system 100 may generally be utilized with implements having any other suitable implement configuration and/or work vehicles having any other suitable vehicle configuration.

As shown in FIG. 4, the system 100 may include one or more fluid-driven actuators configured to actuate one or more tools mounted on the implement 10 relative to a surface across which the implement 10 is being moved. For example, in the illustrated embodiment, the system 100 may include the basket assembly actuator(s) 104. However, in alternative embodiments, the system 100 may include any other suitable fluid-driven actuators, such as fluid-driven actuators (not shown) configured to actuate the disc gang(s) 44, the shank(s) 50, and/or the leveling blade(s) 52. Moreover, it should be appreciated that the fluid-driven actuators may be installed or otherwise mounted on the implement 10 and/or the work vehicle 12.

Furthermore, the system 100 may include a pump 110 configured to supply a fluid (e.g., hydraulic oil) to the fluid-driven actuator(s). More specifically, during operation, the pump 110 may be configured to create a pressure differential between an inlet (not shown) of the pump 110 and an outlet (not shown) of the pump 110. The pressure differential may, in turn, cause the fluid to flow from a reservoir 112 through an inlet conduit 114 to the inlet of the pump 110. The fluid may then discharge from the outlet of the pump 110 and flow through an outlet conduit 116 for delivery to the fluid-driven actuator(s). Moreover, as shown, the pump 110 may be installed on the work vehicle 12 such that the pump 110 may be driven by the engine 24. Additionally, in one embodiment, the pump 110 may be configured as a piston pump having an adjustable swash plate 117. As is generally understood, the volume of fluid being supplied to the fluid-driven actuator(s) by the pump 110 may be varied by adjusting the position or orientation of the swash plate 117. However, in alternative embodiments, the pump 110 may be configured as any other suitable type of pump and/or be installed in any other suitable location (e.g., on the implement 10).

Moreover, the system 100 may include a first valve 118 configured to control the flow of the fluid supplied to the fluid-driven actuator(s). Specifically, in several embodiments, the first valve 118 may be configured as a pressure reducing/relieving valve (PRV) (e.g., a solenoid-activated valve) configured to regulate the pressure of the fluid supplied to the fluid-driven actuator(s). In such embodiments, the first valve 118 may be fluidly coupled to the outlet conduit 116 so as to receive the flow of fluid discharged from the pump 110. The first valve 118 may, in turn, be configured to supply at least a portion of the received flow of fluid to the fluid-driven actuator(s) via an actuator supply conduit 120 such that the fluid-driven actuator(s) receives the flow of fluid from the pump 110 at a desired or selected pressure. Excess or additional fluid received by the first valve 118 that is not necessary to supply the flow of fluid from the pump 110 at the desired pressure may be returned to the reservoir 112 via a first return conduit 122. In one embodiment, the first valve 118 may be installed or otherwise mounted on the implement 10. However, in alternative embodiments, the first valve 118 may be configured as any other suitable type of valve and/or configured to control any other suitable parameter or characteristic of the flow of fluid being supplied to the fluid-driven actuator(s). Moreover, in further embodiments, the first valve 118 may be installed at any other suitable location, such as on the work vehicle 12.

In several embodiments, the system 100 may include a second valve 124 configured to control the flow of the fluid supplied to the first valve 118. As such, the second valve 124 may be fluidly coupled to the outlet conduit 116 at a location upstream of the first valve 118 so as to control the flow rate and/or pressure of the fluid flow being supplied to the first valve 118. Furthermore, the second valve 124 may be fluidly coupled to the first return conduit 122 at a location downstream of the first valve 118. In one embodiment, the second valve 124 may be configured as an electro-hydraulic remote (EHR) valve block installed on the work vehicle 12. However, in alternative embodiments, the second valve 124 may be configured as any other suitable type of valve. Furthermore, the second valve 124 may be installed at any other suitable location, such as on the implement 10.

Additionally, in several embodiments, the system 100 may include a pump compensator 126 configured to control the operation of the pump 110 based on the operation of the second valve 124. More specifically, as shown, a load sensing conduit 128 may extend from the second valve 124 to the compensator 126 such that the compensator 126 receives a load sensing flow of fluid from the second valve 124. In general, one or more flow characteristics (e.g., the pressures) of the load sensing flow of fluid and the flow of fluid being supplied to the first valve 118 by the second valve 124 may be the same or similar. Such flow characteristic(s) may, in turn, be indicative of the load being exerted on the pump 110. In this regard, the compensator 126 may be configured to adjust one or more operating parameters of the pump 110 based on the received load sensing flow of fluid such that the pump 110 is operated at the desired load. For example, in one embodiment, the compensator 126 may be configured to adjust the position of the swash plate 117 of the pump 110 based on the pressure of the received load sensing flow of fluid. In such embodiment, the compensator 126 may include any suitable components, such as springs, valves, diaphragms, seals, and/or the like, that permit the position of the swash plate 117 to be adjusted based on the pressure of the load sensing flow of fluid. However, in alternative embodiments, any other suitable mechanical, electrical, or electromechanical device (e.g., a suitable controller) may be configured to control the operation of the pump 110 based on the operation of the second valve 124.

In accordance with aspects of the present subject matter, the system 100 may include first and second sensors 129, 130. Specifically, in several embodiments, the first sensor 129 may be configured to detect a first pressure upstream of the first valve 118 (e.g., the pressure of the fluid of fluid being supplied to the first valve 118). In this regard, the first sensor 129 may be provided in fluid communication with outlet conduit 116, such as at a location upstream of the first valve 118 and downstream of the second valve 124. Furthermore, the second sensor 130 may be configured to detect a second pressure downstream of the first valve 118 (e.g., the pressure of the fluid of fluid being supplied to the fluid-driven actuator(s)). Thus, the second sensor 130 may be provided in fluid communication with the actuator supply conduit 120, such as at a location downstream of the first valve 118 and upstream of the fluid-driven actuator(s). It should be appreciated that the first and second sensors 129, 130 may correspond to any suitable fluid pressure sensing devices. However, in alternative embodiments, the first and second sensors 129, 130 may be configured to detect any other parameters that are indicative of the first and second pressures, respectively, and/or may be positioned at any other suitable locations.

It should be appreciated that the first and second sensors 129, 130 may have one or more functions. For example, in one embodiment, feedback from the second sensor 130 may be used to control the first valve 118 such that a desired pressure is maintained within the actuator supply conduit 120 independent of the temperature and/or tolerance of the components of the valve 118. Furthermore, in such embodiment, the first sensor 129 may be used to sense the pressure difference across the first valve 118 for use in controlling the second valve 124. Such configuration may allow most of the excess fluid to recirculate within the work vehicle 12.

Additionally, the system 100 may include one or more implement-based controllers 132 positioned on and/or within or otherwise associated with the implement 10. In general, the implement controller(s) 132 may comprise any suitable processor-based device known in the art, such as a computing device or any suitable combination of computing devices. Thus, in several embodiments, the controller(s) 132 may include one or more processor(s) 134 and associated memory device(s) 136 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 136 of the controller(s) 132 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 136 may generally be configured to store suitable computer-readable instructions that, when implemented by the processor(s) 134, configure the implement controller(s) 132 to perform various computer-implemented functions, such as one or more aspects of the method 200 described below with reference to FIG. 6. In addition, the implement controller(s) 132 may also include various other suitable components, such as a communications circuit or module, one or more input/output channels, a data/control bus and/or the like.

It should be appreciated that the implement controller(s) 132 may correspond to an existing controller(s) of the implement 10, itself, or the controller(s) 132 may correspond to a separate processing device(s). For instance, in one embodiment, the implement controller(s) 132 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller(s) 132 may be performed by a single processor-based device or may be distributed across any number of processor-based devices, in which instance such devices may be considered to form part of the implement controller(s) 132.

Moreover, the system 100 may include one or more work vehicle-based controllers 138 positioned on and/or within or otherwise associated with the work vehicle 12. In general, the vehicle controller(s) 138 may comprise any suitable processor-based device known in the art, such as a computing device or any suitable combination of computing devices. Thus, in several embodiments, the controller(s) 138 may include one or more processor(s) 140 and associated memory device(s) 142 configured to perform a variety of computer-implemented functions. Such memory device(s) 142 may generally be configured to store suitable computer-readable instructions that, when implemented by the processor(s) 140, configure the vehicle controller(s) 138 to perform various computer-implemented functions, such as one or more aspects of the method 200 described below with reference to FIG. 6. In addition, the vehicle controller(s) 138 may also include various other suitable components, such as a communications circuit or module, one or more input/output channels, a data/control bus and/or the like.

It should be appreciated that the vehicle controller(s) 138 may correspond to an existing controller(s) of the work vehicle 12, itself, or the controller(s) 138 may correspond to a separate processing device. For instance, in one embodiment, the vehicle controller(s) 138 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller(s) 138 may be performed by a single processor-based device or may be distributed across any number of processor-based devices, in which instance such devices may be considered to form part of the vehicle controller(s) 138. For instance, the functions of the vehicle controller(s) 138 may be distributed across multiple application-specific controllers, such as an engine controller, a transmission controller, a brake system controller, a navigation controller, and/or the like.

Furthermore, in one embodiment, the system 100 may also include the user interface 102. More specifically, the user interface 102 may be configured to receive input (e.g., an input associated with a desired operating parameter(s) of a tool(s) being actuated by the fluid-driven actuator(s)) from the operator of the implement 10. As such, the user interface 102 may include one or more input devices (not shown), such as touchscreens, keypads, touchpads, knobs, buttons, sliders, switches, mice, microphones, and/or the like, which are configured to receive such inputs. In addition, some embodiments of the user interface 102 may include one or more feedback devices (not shown), such as display screens, speakers, warning lights, and/or the like, which are configured to communicate feedback to the operator. In one embodiment, the user interface 102 may be positioned within a cab of the work vehicle 12. However, in alternative embodiments, the user interface 102 may have any suitable configuration and/or be positioned in any other suitable location.

In several embodiments, the vehicle controller(s) 138 may be configured to initially control the operation of the second valve 124 based on an input from the implement operator. Specifically, as shown in FIG. 4, the vehicle controller(s) 138 may be communicatively coupled to the user interface 102 via a wired or wireless connection to allow operator input signals (e.g., indicated by dashed lines 144 in FIG. 4) to be transmitted from the user interface 102 to the controller(s) 138. In this regard, the vehicle controller(s) 138 may be configured to receive operator input signals 144 indicative of a desired or selected pressure and/or flow rate of the flow of fluid being supplied to the first valve 118 by the second valve 124. Furthermore, the vehicle controller(s) 138 may be communicatively coupled to the second valve 124 via a wired or wireless connection to allow control signals (e.g., indicated by dashed line 146 in FIG. 4) to be transmitted from the controller(s) 138 to the second valve 124. As such, the vehicle controller(s) 138 may be configured to transmit control signals 146 to the second valve 124 instructing the second valve 124 to operate in a manner that provides a flow of the fluid from the pump 110 to the first valve 118 having the desired pressure and/or flow rate. Thereafter, the second valve 124 may supply the load sensing flow of fluid to the compensator 126. The compensator 126 may, in turn, be configured to control the operation of the pump 110 based on the received load sensing flow of fluid such that the flow of fluid being discharged from the pump 110 into the outlet conduit 116 has the same or a similar pressure and/or flow rate to the flow of fluid that the second valve 124 is supplying to the first valve 118.

Furthermore, in several embodiments, the implement controller(s) 132 may be configured to control the operation of the first valve 118. Specifically, as shown in FIG. 4, the vehicle controller(s) 138 may be communicatively coupled to vehicle controller(s) 138 via a wired or wireless connection to allow operator input signals 144 received by the vehicle controller(s) 138 to be transmitted from the vehicle controller(s) 138 to the implement controller(s) 132. In this regard, the implement controller(s) 132 may be configured to receive operator input signals 144 indicative of one or more operating parameters of the tool(s) being actuated by the fluid-driven actuator(s). For example, in one embodiment, the operator input signals 144 may be indicative of a desired down force to be applied to the basket assembly(ies) 54 by the associated actuator(s) 104. However, in alternative embodiments, the implement controller(s) 132 may be configured to receive the operator input signals 144 directly from the user interface 102. Moreover, the implement controller(s) 132 may be communicatively coupled to the first valve 118 via a wired or wireless connection to allow control signals (e.g., indicated by dashed line 148 in FIG. 4) to be transmitted from the controller(s) 132 to the first valve 118. As such, the implement controller(s) 132 may be configured to transmit control signals 148 to the first valve 118 instructing the first valve 118 to supply a flow of the fluid to the fluid-driven actuator(s) at a pressure such that the associated tool(s) have the desired operating parameter(s). Any fluid exiting the fluid-driven actuator(s) may be returned to the reservoir 112 via a second return conduit 150.

Additionally, the implement controller(s) 132 may be configured to determine a pressure differential across the first valve 118. Specifically, as shown in FIG. 4, the implement controller(s) 132 may be communicatively coupled to the first and second sensors 129, 130 via a wired or wireless connection to allow measurement signals (e.g., indicated by dashed lines 152 in FIG. 4) to be transmitted from the first and second sensors 129, 130 to the controller(s) 132. In this regard, the implement controller(s) 132 may be configured to determine a first pressure upstream of the first valve 118 based on the measurement signals 152 received from the first sensor 129. Furthermore, the implement controller(s) 132 may be configured to determine a second pressure downstream of the first valve 118 based on the measurement signals 152 received from the second sensor 130. Thereafter, the implement controller(s) 132 may be configured to determine the pressure differential across the first valve 118 based on the determined first and second pressures. For instance, the implement controller(s) 132 may include a look-up table, suitable mathematical formula, and/or algorithms stored within its memory 136 that correlates the received measurement signals 152 to the first and second pressures and/or the pressure differential.

In accordance with aspects of the present subject matter, the implement controller(s) 132 may be configured to control the operation of the second valve 124 based on the determined pressure differential. Specifically, the implement controller(s) 132 may be configured to transmit instruction signals (e.g., as indicated by dashed line 154) to vehicle controller(s) 138 instructing the vehicle controller(s) 138 to transmit control signals 146 to the second valve 124. Such control signals 146 may instruct the second valve 124 to supply a flow of the fluid to the first valve 118 based on the determined pressure differential. Thereafter, the second valve 124 may supply the load sensing flow of fluid to the compensator 126. The compensator 126 may, in turn, be configured to control the operation of the pump 110 such that the flow of fluid being discharged from the pump 110 into the outlet conduit 116 has the same or a similar pressure and/or flow rate to the flow of fluid that the second valve 124 is supplying to the first valve 118. In this regard, the pump 110 may be operated such that flow of fluid generated by the pump 110 has the minimum pressure ad/or flow rate to necessary to maintain the desired pressure differential across the first valve 118, thereby reducing the amount of energy wasted by the pump 110 supplying unnecessary fluid to the first valve 118.

In one embodiment, the implement controller(s) 132 may be configured to monitor the pressure differential across the first valve 118 and adjust an operational parameter of the second valve 124 when the pressure differential has exceeded or fallen below a threshold value(s). Specifically, the implement controller(s) 132 may be configured to compare the values associated with the monitored pressure differential to a maximum threshold and/or a minimum threshold. Thereafter, in the event that the value(s) of the monitored pressure differential exceeds the maximum threshold (thereby indicating that the pressure differential across the first valve 118 may be too high), the implement controller(s) 132 may be configured to transmit instruction signals 154 to vehicle controller (s) 138 instructing the vehicle controller(s) 138 to transmit control signals 146 to the second valve 124 instructing the second valve 124 to operate in a manner that decreases the pressure and/or flow rate of the fluid being supplied to the first valve 118. The decreased pressure and/or flow rate supplied by the second valve 124 may, in turn, control the operation of the pump 110 (e.g., via the compensator 126) such that the flow of fluid being discharged by the pump 110 into the outlet conduit 116 has the decreased pressure and/or flow rate being supplied to the first valve 118. Conversely, in the event that the value(s) of the monitored pressure differential falls below a minimum threshold (thereby indicating that the pressure differential across the first valve 118 may be too low), the implement controller(s) 132 may be configured to transmit instruction signals 154 to vehicle controller (s) 138 instructing the vehicle controller(s) 138 to transmit control signals 146 to the second valve 124 instructing the second valve 124 to operate in a manner that increases the pressure and/or flow rate of the fluid being supplied to the first valve 118. The increased pressure and/or flow rate supplied by the second valve 124 may, in turn, control the operation of the pump 110 (e.g., via the compensator 126) such that the flow of fluid being discharged by the pump 110 into the outlet conduit 116 has the increased pressure and/or flow rate being supplied to the first valve 118.

It should be appreciated that the control of the second valve 124 based on the determined pressure differential may override control of the second valve 124 based on the operator input signals 144. As indicated above, the vehicle controller(s) 138 may receive operator input signals 144 from the user interface 102 instructing the vehicle controller(s) 138 to control the operation of the second valve 124 in a particular manner. Moreover, the vehicle controller(s) 138 may also simultaneously receive instruction signals 154 from the implement controller(s) 132 instructing the vehicle controller(s) 138 to control the operation of the second valve 124 to operate in accordance with the determined pressure differential across the first valve 118 (e.g., a different manner the operator input signals 144 in certain instances). As such, in several embodiments, the vehicle controller(s) 138 may be configured to ignore the operator input signals 144 received from the user interface 102 and, instead, transmit control signals 146 based on the instruction signals 154 received from the implement controller(s) 132.

Figure 5:
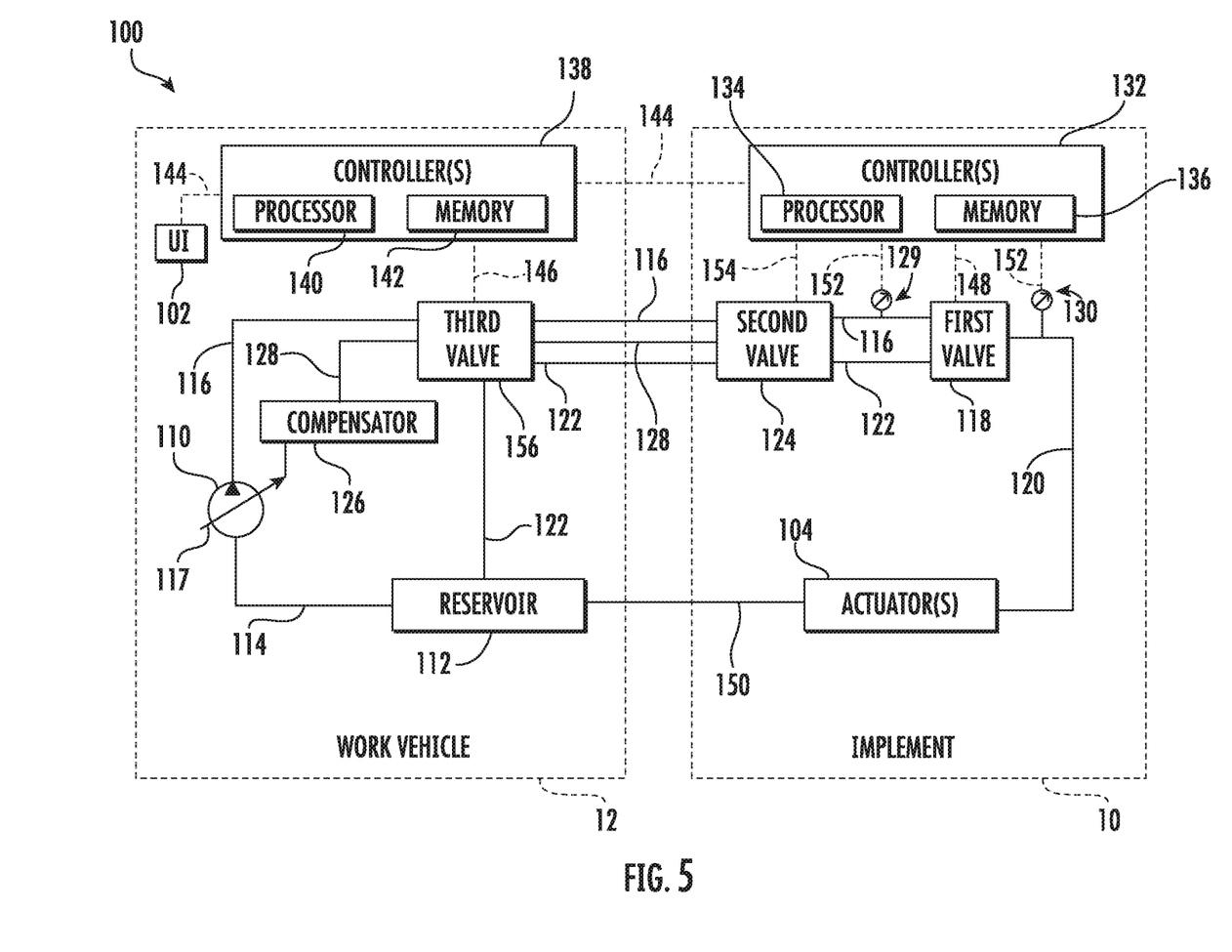
FIG. 5 illustrates a schematic view of another embodiment of a system for regulating the flow of fluid supplied to actuators of an agricultural implement in accordance with aspects of the present subject matter, particularly illustrating the system including first and second valves installed on the implement.

Referring now to FIG. 5, a schematic view of another embodiment of a system 100 for regulating the flow of fluid supplied to actuators of an agricultural implement is illustrated in accordance with aspects of the present disclosure. As shown in FIG. 5, the system 100 may generally be configured the same as or similar to that described above with reference to FIG. 4. For instance, the system 100 may include a first valve 118 configured to control the flow of fluid supplied to the fluid-driven actuator(s) and a second valve 124 configured to control the flow of fluid supplied to the first valve 118. However, as shown in FIG. 5, unlike the above-described embodiments, the second valve 124 may be installed on the implement 10. Furthermore, unlike the above-described embodiments, the system 100 may include a third valve 156 installed on the work vehicle 12 and configured to control the flow of fluid supplied to the second valve 124. As such, the third valve 156 may be fluidly coupled to the outlet conduit 116 at a location upstream of the second valve 124 so as to control the flow rate and/or pressure of the fluid flow being supplied to the second valve 124. Moreover, the third valve 156 may be fluidly coupled to the first return conduit 122 at a location downstream of the second valve 124. Additionally, the third valve 156 may be fluidly coupled to the load sensing conduit 128 at a location downstream of the second valve 124 and upstream of the compensator 126. In this regard, the load sensing flow of fluid from the second valve 124 may flow through the third valve 156 when being supplied to the compensator 126. However, the load sensing flow of fluid may be unaffected or otherwise unchanged by the operation of the third valve 156 such that the compensator 126 controls the pump 110 based on the operation of the second valve 124. In one embodiment, the third valve 156 may be configured as an electro-hydraulic remote (EHR) valve block. However, in alternative embodiments, the third valve 156 may be configured as any other suitable type of valve, such as on-off valve. In such embodiment, the operator may set the third valve 156 to a wide open position such that the implement controller(s) 132 control the operation of the first and second valves 118, 124 to perform the above-described pressure control.

In several embodiments, the vehicle controller(s) 138 may be configured to initially control the operation of the third valve 156. Specifically, as shown in FIG. 4, the vehicle controller(s) 138 may be communicatively coupled to the third valve 156 via a wired or wireless connection to allow control signals 146 to be transmitted from the controller(s) 138 to the third valve 156. As such, the vehicle controller(s) 138 may be configured to transmit control signals 146 to the third valve 156 instructing the third valve 156 to operate in a manner that provides a flow of the fluid to the second valve 124 having a pressure and/or flow rate associated with the operator input signals 144. As described above, the implement controller(s) 132 may be configured to control the operation of the second valve 124 based on the determined pressure differential to control the flow of fluid supplied to the first valve 118. As such, it should be appreciated that, in the embodiment of the system 100 shown in FIG. 5, it may not be necessary to override control of the third valve 156 based on the operator input signals 144. Instead, as described above, the operation of the pump 110 may be controlled based on the operation of the second valve 124 (e.g., based on the load sensing fluid flow provided by the second valve 124) such that the operation of the pump 110 may be independent of the operation of the third valve 156 and the operator input signals 144.

Figure 6:
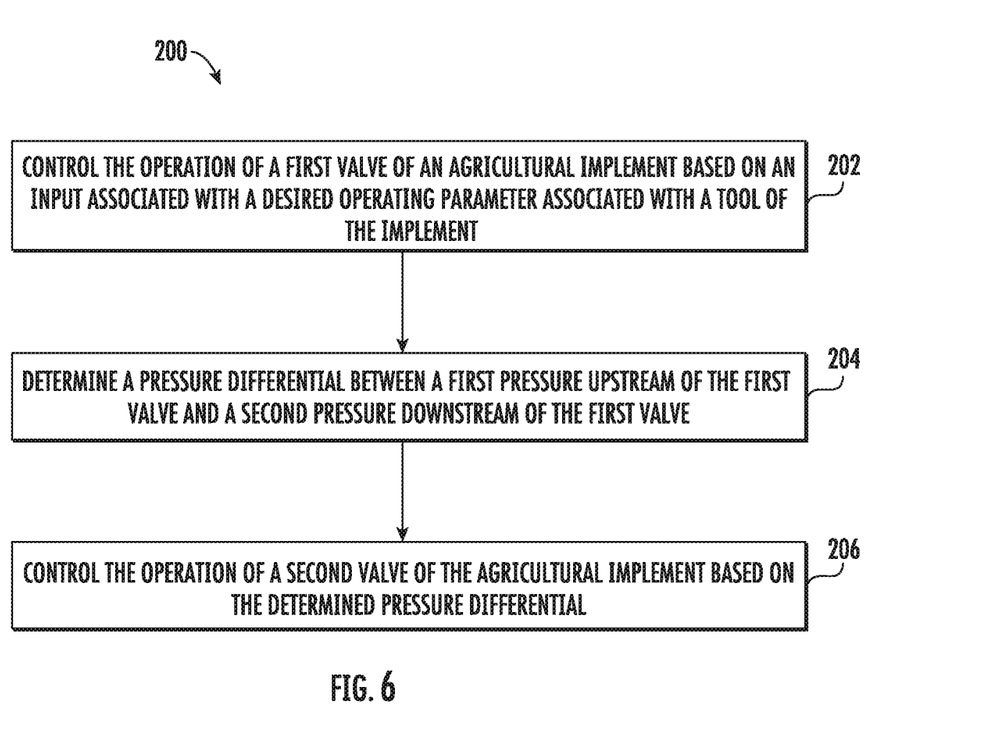
FIG. 6 illustrates a flow diagram of one embodiment of a method for regulating the flow of fluid supplied to actuators of an agricultural implement in accordance with aspects of the present subject matter.

Referring now to FIG. 6, a flow diagram of one embodiment of a method 200 for regulating the flow of fluid supplied to actuators of an agricultural implement is illustrated in accordance with aspects of the present subject matter. In general, the method 200 will be described herein with reference to the agricultural implement 10, the work vehicle 12, and the system 100 described above with reference to FIGS. 1-5. However, it should be appreciated by those of ordinary skill in the art that the disclosed method 200 may generally be implemented with any agricultural implement having any suitable implement configuration, any work vehicle having any suitable vehicle configuration, and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling, with a computing device, the operation of a first valve of an agricultural implement based on an input associated with a desired operating parameter associated with a tool of the implement. For instance, as described above, the implement controller(s) 132 may be communicatively coupled to the first valve 118. As such, the implement controller(s) 132 may be configured to transmit control signals 148 to the first valve 118 instructing the first valve 118 to supply a flow of the fluid to the fluid-driven actuator(s) at a pressure such that the associated tool(s) have the desired operating parameter(s).

Additionally, at (204), the method 200 may include determining, with the computing device, a pressure differential between a first pressure upstream of the first valve and second pressure downstream of the first valve. For instance, as described above, the implement controller(s) 132 may be communicatively coupled to the first and second sensors 129, 130. As such, the implement controller(s) 132 may be configured to receive measurement signals 152 from the first and second sensors 129, 130. Thereafter, the implement controller(s) 132 may be configured to determine or estimate the pressure differential across the first valve 118 based on the received measurement signals 152.

Moreover, as shown in FIG. 6, at (206), the method 200 may include controlling, with the computing device, the operation of a second valve of the agricultural implement based on the determined pressure differential. For instance, as described above, the implement controller(s) 132 may be communicatively coupled to the second valve 124. As such, the implement controller(s) 132 may be configured to transmit control signals 154 to the second valve 124 instructing the second valve 124 to supply a flow of the fluid to the first valve 118 based on the determined pressure differential.

It is to be understood that the steps of the method 200 are performed by the controllers 132, 138 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controllers 132, 138 described herein, such as the method 200, is implemented in software code or instructions which are tangibly stored on a tangible computer readable medium. The controllers 132, 138 load the software code or instructions via a direct interface with the computer readable medium or via a wired and/or wireless network. Upon loading and executing such software code or instructions by the controllers 132, 138, the controllers 132, 138 may perform any of the functionality of the controllers 132, 138 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for regulating the flow of fluid supplied to actuators of an agricultural implement, the system comprising:
   a tool;
   a fluid-driven actuator configured to actuate the tool relative to a surface;
   a pump configured to supply fluid to the fluid-driven actuator;
   a valve configured to control a flow of the fluid supplied to the fluid-driven actuator;
   a first sensor configured to detect a parameter indicative of a first pressure upstream of the valve;
   a second sensor configured to detect a parameter indicative of a second pressure downstream of the valve; and
   a controller communicatively coupled to the first and second sensors, the controller configured to determine a pressure differential across the valve based on measurement signals received from the first and second sensors;
   wherein the valve corresponds to a first valve, the system further comprising a second valve positioned upstream of the first valve, the second valve configured to control a flow of the fluid supplied to the first valve, the controller further configured to control an operation of the second valve based on the determined pressure differential.

2. The system of claim 1, wherein an operation of the pump is controlled based on the operation of the second valve.

3. The system of claim 1, wherein the control of the second valve based on the determined pressure differential overrides control of the second valve based on an operator input signal.

4. The system of claim 1, wherein the first valve is installed on the agricultural implement and the second valve is installed on a work vehicle configured to tow the agricultural implement.

5. The system of claim 1, wherein the first and second valves are installed on the agricultural implement.

6. The system of claim 1, wherein the controller is further configured to monitor the pressure differential relative to a threshold value and adjust an operational parameter of the second valve when the monitored pressure differential has exceeded or fallen below the threshold value.

7. The system of claim 1, wherein the controller is further configured to control the operation of the valve based on an input associated with a desired operating parameter associated with the tool.

8. The system of claim 7, wherein the controller is configured to receive the input from an operator with the agricultural implement.

9. The system of claim 1, wherein the pump is installed on a work vehicle configured to tow the agricultural implement.

10. The system of claim 1, wherein the controller is installed on the agricultural implement.

11. The system of claim 1, wherein the tool comprises a basket assembly.

12. A method for regulating the flow of fluid supplied to actuators of an agricultural implement, the agricultural implement comprising a fluid-driven actuator configured to actuate a tool of the agricultural implement relative to a surface, a pump configured to supply fluid to the fluid-driven actuator, and a first valve configured to control a flow of the fluid supplied to the fluid-driven actuator, the method comprising:
controlling, with a computing device, an operation of the first valve based on an input associated with a desired operating parameter associated with the tool;
determining, with the computing device, a pressure differential between a first pressure upstream of the first valve and second pressure downstream of the first valve; and
controlling, with the computing device, an operation of a second valve of the agricultural implement based on the determined pressure differential, the second valve positioned upstream of the first valve and configured to control a flow of the fluid supplied by the pump to the first valve.

13. The method of claim 12, wherein an operation of the pump is controlled based on the operation of the second valve.

14. The method of claim 12, wherein the control of the second valve based on the determined pressure differential overrides control of the second valve based on an operator input signal.

15. The method of claim 12, wherein the first valve is installed on the agricultural implement and the second valve is installed on a work vehicle configured to tow the agricultural implement.

16. The method of claim 12, wherein the first and second valves are installed on the agricultural implement.

17. The method of claim 12, further comprising:
monitoring, with the computing device, the pressure differential relative to a threshold value; and
adjusting, with the computing device, an operational parameter of the second valve when the monitored pressure differential has exceeded or fallen below the threshold value.

18. The method of claim 12, further comprising:
receiving, with the computing device, the input from an operator the agricultural implement.

19. The method of claim 12, wherein the pump is installed on a work vehicle configured to tow the agricultural implement.

* * * * *